Dec. 30, 1958   A. H. LAMB   2,866,873
INSTRUMENT RELAY
Filed July 14, 1955   2 Sheets-Sheet 1
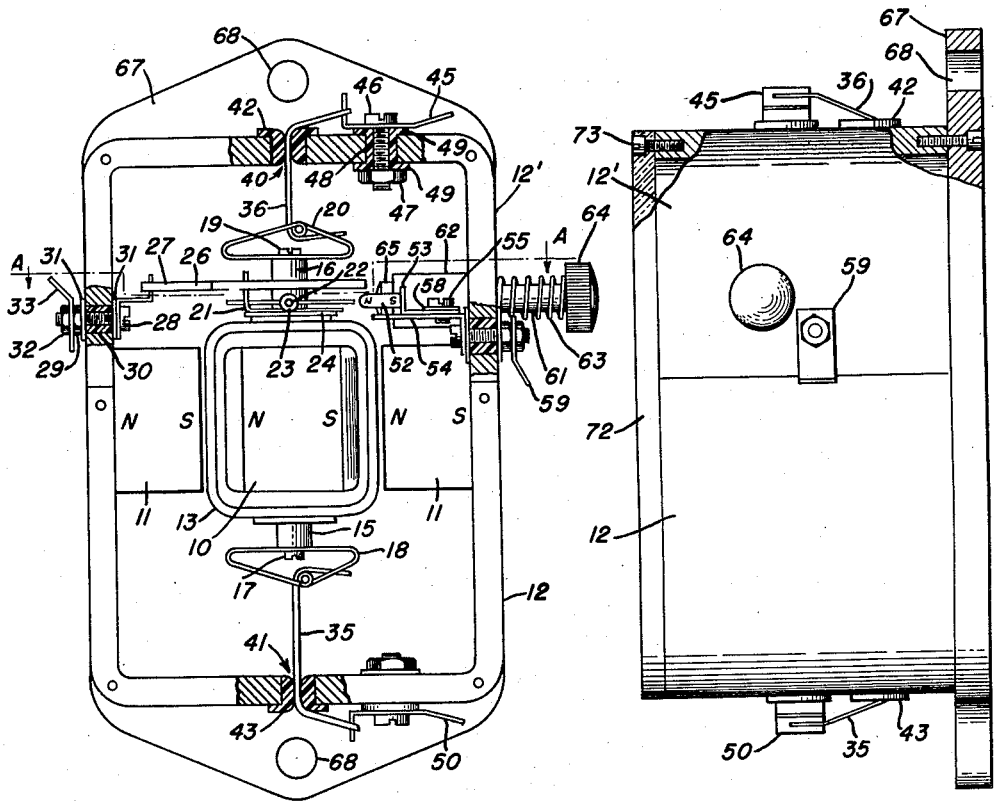
Fig-1
Fig-2
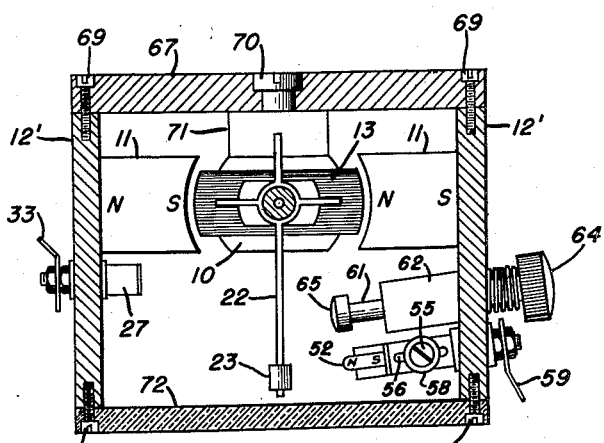
Fig-3
ANTHONY H. LAMB
INVENTOR
BY
Rudolph J. Juick
ATTORNEY Dec. 30, 1958    A. H. LAMB    2,866,873
INSTRUMENT RELAY
Filed July 14, 1955    2 Sheets-Sheet 2
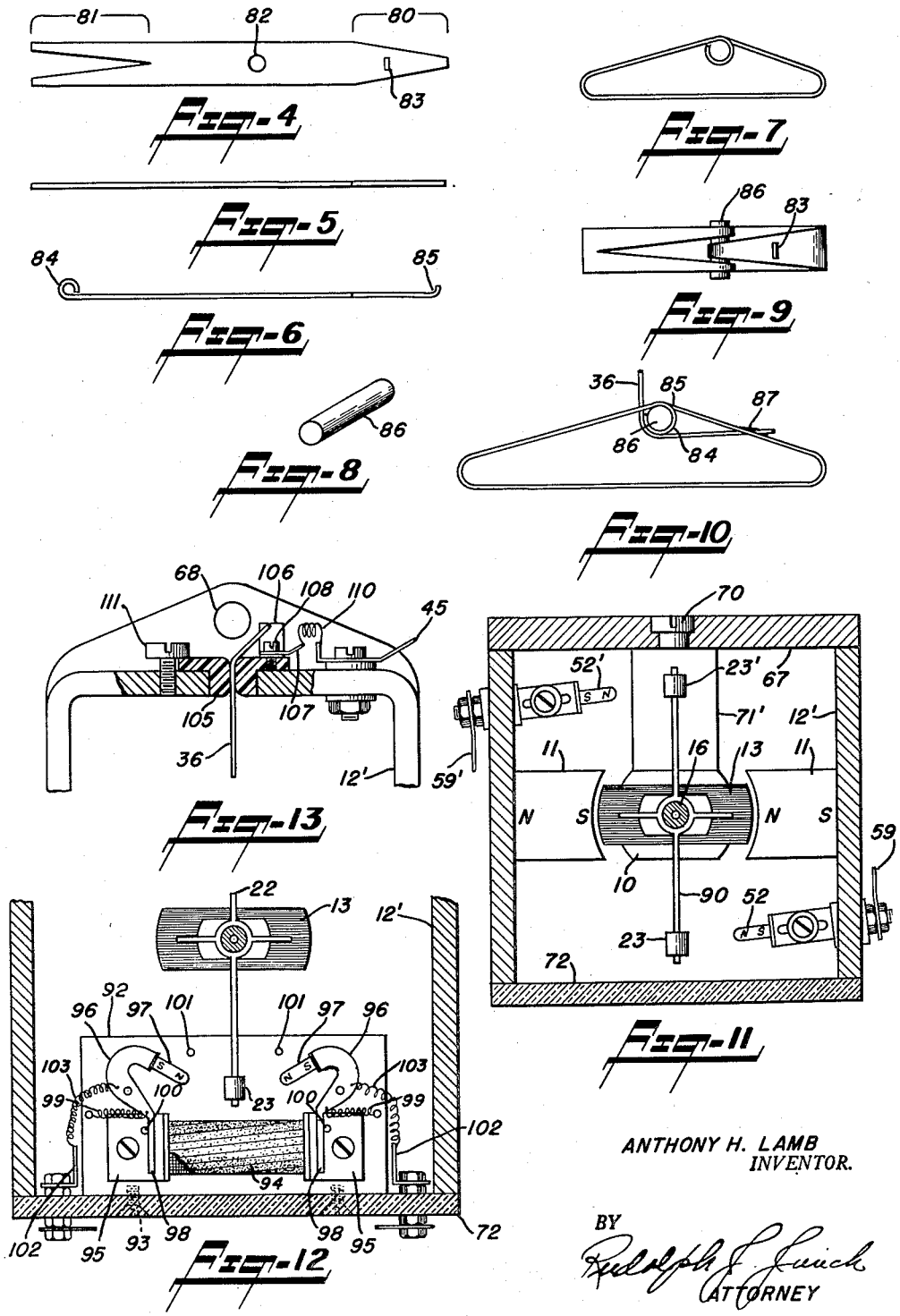
ANTHONY H. LAMB
INVENTOR.
BY
ATTORNEY

United States Patent Office

2,866,873
Patented Dec. 30, 1958

2,866,873

INSTRUMENT RELAY

Anthony H. Lamb, Hillside, N. J., assignor, by mesne assignments, to Daystrom, Incorporated, Murray Hill, N. J., a corporation of New Jersey Application July 14, 1955, Serial No. 522,056

17 Claims. (Cl. 200—110)

This invention relates to instrument type relays and more particularly to sensitive relays of the permanent magnet, movable coil class.

Sensitive relays of the class contemplated by this invention comprises a wire-wound movable coil rotatable in a magnetic field and carrying a contact arm that is adapted to engage one or more associated stationary contacts. Heretofore, the movable coil of the relay was pivotally mounted by means of aligned pivots operating in jewelled bearings. While such coil-mounting arrangements afford a fairly high instrument sensitivity, the pivots and bearings are subject to damage from shock and the pivot-bearing combination introduces a certain amount of frictional torque which is objectionable in highly sensitive instruments.

An object of this invention is the provision of improved means for mounting the movable coil of a highly sensitive, instrument type relay, which means is highly efficient and reliable in action and overcomes the defects of the usual pivot-in-jewel arrangement.

An object of this invention is the provision of an instrument type relay of novel mechanical construction and which can be manufactured in small size and yet is of rugged character.

An object of this invention is the provision of a sensitive relay of the permanent magnet, movable coil class in which the movable coil is mounted in operating position by taut suspension means which means also serves to conduct electrical current to the coil.

An object of this invention is the provision of a sensitive relay comprising a wire-wound movable coil, taut suspension elements mounting the coil for rotational movement, a permanent magnet core encircled by the coil, a contact arm carried by the coil and one or more stationary contacts adapted to be engaged by the contact arm upon a predetermined angular rotation of the movable coil.

An object of this invention is the provision of an instrument relay of the type stated in which the magnetic system includes a yoke in the general form of an open frame extending substantially around the movable coil, said yoke constituting a part of the relay case and serving as a supporting means for the taut suspensions.

An object of this invention is the provision of a sensitive relay comprising an open, substantially-rectangular frame at least part of which is made of soft-iron, aligned suspension elements secured by spring means to opposite sides of a wire-wound movable coil, said suspension means being also secured to opposite sides of the frame, a permanent magnet core encircled by the coil, a pointer secured to the movable coil and carrying at its free end a rider of magnet material, a stationary contact of magnetic material adjustably carried by the frame and adapted to be engaged by the said rider upon rotation of the movable coil about an axis formed by the aligned suspension elements, and means operable to disengage the rider from the stationary contact.

An object of this invention is the provision of a relay of the above-stated type wherein the frame constitutes a part of the relay case, the other parts of the case comprising plates closing the open ends of the frame and at least one of said plates being made of a transparent material.

An object of this invention is the provision of an arrangement for securing a suspension element to the movable coil of an instrument said arrangement comprising a leaf spring having arcuately-curved ends, intermediate portions of the spring being bent upwardly so that the said arcuately-curved ends form a transverse channel, a pin disposed within such channel, an end of the suspension element passing around the pin and through an aperture formed in spring, and means securing the element to the spring at a point adjacent said aperture.

These and other objects and advantages will become apparent from the following description when taken with the accompanying drawings illustrating several embodiments of the invention. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

Figure 1 is a front elevation of an instrument relay embodying the invention but with the front cover plate removed;

Figure 2 is a side elevation of the relay;

Figure 3 is a transverse, sectional view taken along the line A—A of Figure 1;

Figure 4 is a plan view, in enlarged scale, showing the flat stock of which the leaf springs are formed;

Figure 5 is a corresponding side elevational view;

Figure 6 is a side elevational showing the formation of the arcuately-curved ends;

Figure 7 is a side elevation showing intermediate portions of the stock bent upwardly to bring the arcuately-curved ends into transverse alignment thereby forming a channel;

Figure 8 is an isometric view of the pin;

Figure 9 is a top plan view of the completed spring and showing the pin disposed within the transverse channel formed by the arcuate spring ends;

Figure 10 is a still further enlarged side elevation of the spring showing an end of the suspension element secured thereto;

Figure 11 is a transverse sectional view generally similar to Figure 3 and showing another embodiment of the invention;

Figure 12 is a similar, fragmentary view showing an electro-magnetic arrangement for resetting the relay contacts; and Figure 13 is a fragmentary view generally similar to Figure 1 and showing a modification of the means for anchoring the outer ends of the suspension elements to permit adjustment of the zero position of the movable coil.

Reference is now made specifically to Figures 1, 2 and 3 wherein the reference numeral 10 identifies a transversely-charged permanent magent core of substantially circular or other desired cross section. Laterally spaced from the polar faces of the magnet core are a pair of auxiliary permanent magnets 11 secured to an open soft-iron frame 12 in any suitable manner, said magnets each having one arcuate polar face (as best shown in Figure 3) to thereby form uniform, arcuate flux gaps accommodating the active sides of a wire-wound movable coil 13. It may here be pointed out that auxiliary magnets 11 and the magnet core 10 are in series thereby providing a high concentration of magnetic flux across the air gaps and increasing the sensitivity of the relay. The return path for the magnet flux is through the side arms and base of the frame 12. Those skilled in this art will understand that the auxiliary magnets may be omitted in instruments designed for a lower sensitivity whereupon the side arms, or legs, of the yoke 12 may be brought closer to the movable coil. In the illustrated construction, the soft-iron yoke 12 is of U-shape and a complementary U-shaped frame 12' made of non-magnetic material such as brass, completes the rectangular frame. Alternatively, the frame 12' may also be of soft-iron in which case the entire rectangular frame can be formed as a single unit. The particular type of frame construction utilized in a particular instrument will depend primarily upon the permissible cross sectional area of the magnetic return path from the standpoint of instrument size and weight, it being known that the return path should have a cross sectional area sufficient to carry the magnetic flux generated by the one or more permanent magnets.

Secured to opposite sides of the movable coil are a pair of pivot bases 15, 16, each in the form of a cylindrical post extending from a flat base that is affixed to the coil in any suitable manner, as for example, by cement. The lower pivot base 15 is of simple form having a threaded axial hole to receive a screw 17 which secures the leaf spring 18 to the pivot base. The circular post of the upper pivot base 16 is also provided with such threaded axial hole to receive the screw 19 which secures the upper leaf spring 20 in place. However, the cylindrical post of the upper pivot base is somewhat longer to provide a mounting support for the spring abutment 21 and contact arm 22, the latter carrying a soft-iron rider 23 at the free end. In the assembly, the spring abutment is in electrical contact with the contact arm 22 but both such members are electrically insulated from the pivot base 16 as by means of the insulating washer 24, and suitable insulating tubes which are not shown in the drawing but which are disposed between the outer wall of the pivot post and the inner wall defining the positioning hole in the abutment and contact arm.

The inner end of a spiral hair spring 26 is secured, as by solder, to the upstanding end of the abutment 21 and the outer spring end similarly is secured to the fixed terminal 27 that is secured to, but electrically insulated from, the frame portion 12'. As shown in Figure 1, the fixed terminal 27 is secured in fixed position by the screw 28 and cooperating nut 29, electrical insulation of the terminal and frame being provided by the insulator bushing 30 and insulator washers 31. A second nut 32 secures the connection terminal 33 in place. It will be apparent, therefore, that the relay contact arm 22 can be connected into an external circuit by means of a wire attached to the terminal 33 and that the contact arm is electrically isolated from the movable coil circuit. The ends of the movable coil winding are individually soldered to the pivot bases 15 and 16 whereby energizing current for the movable coil will flow therethrough through the two suspension elements 35, 36, one end of each such element being attached to the respective leaf springs 18 and 20, as will be described in detail hereinbelow, and the other element ends being suitably secured to the base of the frame portions 12 and 12', as will now be described.

A pair of axially-aligned holes 40, 41 are provided in the base of each frame 12, 12' and outwardly flanged, cup-like insulating bushings 42, 43 are force-fitted into such holes, each bushing having a central hole through which pass the respective elements 35, 36. The suspension elements 35, 36 may be in the form of a thin, cylindrical filament or in the form of a thin, flat ribbon, the latter form generally being preferred. In such case, the central holes in the buhings 42, 43 will be rectangular. A connection terminal 45 is secured to the frame 12' by a screw 46 and nut 47, said terminal being electrically insulated from the frame by means of the insulator bushing 48 and insulator washers 49. The end of the upper suspension element 36 is secured to such terminal as by solder and the end of the lower suspension element 35 similarly is secured to the connection terminal 50. In general, the suspension elements are made taut to retain the movable coil in its true operating position in the air gap even though the instrument is disposed in positions other than vertical as shown in the drawings. Also, the resilient character of the attachment of the suspension elements to the movable coil (through the leaf springs) prevents breaking of the taut suspension elements under mechanical shock.

Current flowing through the movable coil will cause the coil to rotate about an axis defined by the taut suspension elements and under proper conditions the rider on the movable contact arm will engage the stationary contact 52, here shown as a small permanent magnet secured to the upturned end of a supporting plate 53. Such supporting plate 53 is slidably secured to the bracket 54, that is to say, when the fastening screw 55 is tightly threaded into the hole provided in the bracket, the magnet contact 52 is retained firmly in fixed position, but upon loosening the screw 55 the contact-supporting plate 53 is subject to limited movement toward or away from the movable contact arm to adjust the normal spacing between the contact arm and stationary contact to a desired value. As shown in Figure 3, such sliding adjustment of the supporting plate 53 is provided by the elongated slot 56 said slot having a transverse width less than the head diameter of the fastening screw and associated washer 58. The bracket 54 may be secured to the frame 12' and electrically insulated therefrom in the same manner as described with reference to the fixed, spring terminal 31, connection terminal 59 serving to connect the fixed contact to an external circuit. It will now be apparent that the relay contacts, which are electrically isolated from the relay movable coil circuit, will control the closure or completion of an external circuit connected to the terminals 33 and 59. The magnitude of the current which can be controlled by the relay contacts is determined primarily by the physical dimensions of the spiral hair spring 26. Since such hair spring imposes a restraining torque upon movable coil rotation, such spring will, in a highly sensitive relay, be very thin and of filamentary character. The current which can safely flow through a filamentary spring of this type will be substantially less than the current-carrying capacity of the relay contacts. Such current limitation is not serious as highly sensitive relays are usually employed to control the actuation of suitable power relays which, in turn, are provided with heavy duty load-control contacts. On the other hand, the magnetic contact type relay contacts are particularly desirable in a very sensitive relay to assure a good contact closure in spite of the relatively weak torque developed by the flow of small currents through the movable coil.

Although the relay construction shown in Figures 1 to 3 includes the spiral hair spring for the purpose of separating the movable coil circuit from the contact circuit, it will be apparent that the invention is not restricted to such specific construction. More particularly, the spiral hair spring may be omitted and the movable contact arm can be grounded to the supporting pivot base whereupon the one suspension element 36 will serve to conduct current to one side of the movable coil and to the movable contact arm.

One arrangement for separating the movable contact arm from the stationary contact takes the form of a push rod 61 passing through an opening provided in the frame 12' and through the sleeve bushing 62 that is secured to the frame in any suitable manner. A coiled spring 63, disposed between the frame 12' and the button 64 serves to bias the rod so that the tip 65 normally is retracted out of the path of travel of the rider 23 carried by the movable contact arm. Upon closure of the contacts 23 and 52, a manual separation or resetting thereof is effected by pressing upon the button 64 until the resetting tip 65, preferably made of a suitable insulating material such as rubber, or plastic, forces the contact arm away from the stationary contact 52 a distance sufficient to move the rider 23 beyond the magnetic field of influence of the magnet contact 52.

The substantially rectangular frame formed by the two U-shaped portions 12, 12' constitutes the side walls of the instrument case. One open side of the frame is closed by a mounting plate 67 which plate may be made of an opaque plastic and secured to the frame by screws 69. Parts of the plate 67 extend beyond the frame and are provided with holes 68 for receiving mounting screws. The permanent magnet core 10 is carried by the back plate 67 being secured in position by means of one or more bolts 70 and spaced by a suitable spacer 71 of non-magnetic material. The front of the frame is closed by a preferably transparent plate 72 secured to the frame by screws 73 to complete the instrument housing.

Reference is now made to Figures 4–10 for a description of the leaf spring by means of which an end of each suspension element is secured to the instrument movable coil. Each spring is formed from a thin strip of spring material, such as Phosphor bronze, punched to provide a generally tapered end section 80, a bifurcated end section 81, a central hole 82 and an aperture 83. The free ends of the bifurcated section 81 are then each curled into a substantially closed loop 84 and the tapered end is curled into a partial loop 85 of the same diameter. After this the end sections 80 and 81 are bent upward to bring the looped ends 84 and 85 into transverse alignment, as best shown in Figures 7 and 9, thereby forming what may be termed a transverse channel. A preferably round pin, or rod 86 is placed in such channel and the encircling ends 84 and partially-encircling end 85 are secured to the pin as by solder. As shown in the greatly enlarged view of Figure 10, an end of the suspension element 36 is passed between the spaced bifurcations, under the pin 86 and through the rectangular aperture 83, whereupon the protruding end may be soldered to the leaf spring as indicated by the numeral 87. Such assembled spring and suspension is secured to the movable coil by the screws 17, 19 shown in Figure 1, the screws passing through the holes 82 provided in the leaf spring. It is pointed out that the holes 82, in the leaf springs, are slightly offset with respect to the center of the leaf spring so that when suspension elements are drawn taut the movable coil will be balanced about its rotation axis. As the suspensions are drawn taut, each will be drawn tightly around the associated pin 86 and the upper section of each leaf spring will spread somewhat from its base portion. Such arrangement maintains the desired tension on the suspension elements yet protects the mechanism from damage by shock. Further, toward this end, there are no sharp corners or bends in the suspension elements throughout their effective lengths. Specifically, the inner end of each suspension element is drawn up against a significant portion of the peripheral surface of its pin 86, and the outer ends of the elements are drawn up against the rounded surface defining the hole in the locating bushings 42 and 43.

Figure 11 is generally similar to Figure 3 and shows a modification of the contact arrangement wherein the contact or load circuit is electrically isolated from the movable coil circuit without the need of a spiral-hair spring. In this modification the two suspension elements are utilized to conduct the current to the movable coil and the contact arm 90 is electrically insulated from the pivot base 16. The contact arm carries a pair of soft-iron riders 23, 23' adapted to engage the cooperating stationary contacts 52, 52' to close a control circuit connected between the connection terminals 59, 59'. One or more normally-operable reset rods, such as the rod 61 shown in Figures 1 and 3, may be provided to separate the movable contacts from the stationary contacts. The width of the non-magnetic spacer 71' is determined by the length of the contact arm carrying the second rider 23'.

An electro-magnetic contact resetting arrangement may be provided in addition to or in place of the manual resetting arrangement already described. For example, and with specific reference to Figure 1 a small solenoid coil can be mounted on the side 12' said solenoid coil having a spring-biased armature associated therewith. Energization of the solenoid coil will cause the armature to move the reset rod 61 inwardly to thereby reset the contacts. Since the solenoid and armature constitute a separate unit, the manual resetting of the contacts may still be effected by merely pressing the armature toward the instrument case.

A strictly electro-magnetic resetting arrangement is shown in Figure 12 which is a fragmentary, transverse sectional view somewhat similar to Figure 3. Here are shown the movable coil 13 carrying the contact arm 22 having the soft-iron rider 23 attached at one end. A deck 92 is disposed below the contact arm and is secured to the front plate 72 of the instrument case as by the screws 93. A solenoid coil 94 is secured in fixed position relative to the plate 92 by means of the end brackets 95 the leads from such coil being brought out of the case in any suitable manner. Pivotally mounted on the plate 92 are a pair of arms 96, each arm carrying a permanent magnet contact 97 at one end and a soft-iron disc 98 at the other end. Each arm is biased by a spring 99 against suitable stops 100, whereby the contacts 97 normally are disposed in a fixed position relative to the zero center position of the movable contact arm 22. Upon engagement of the soft-iron rider 23 with one or the other of the stationary contacts 97 a resetting thereof is effected by energizing the solenoid coil 94. Energization of the coil attracts the soft-iron discs 98 thereto causing a rotary movement of the arms 96 so that the stationary contacts 97 spread apart. Upon such outward movement of the contacts 96 the rider 23 will be carried by one of the contacts until the movable contact arm 22 strikes against one or the other of the stops 101 extending upwardly from the mounting plate 92. Further movement of the contacts results in a separation of the rider from the engaged contact after which the solenoid coil may be de-energized. Each of the contacts 96 is connected to its connection terminal 102 by a lead 103 and the movable contact arm can be connected to its similar terminal through a hair spring as described with reference to the Figure 1 construction. Alternatively, current to the movable contact arm may be supplied through the upper suspension element.

It is generally desirable to provide some means whereby the normal, or zero current, position of the movable coil can be adjusted. An arrangement for accomplishing this is shown in Figure 13 wherein the insulator bushing 105 has a flange portion that is somewhat thicker and of greater diameter than the corresponding bushing 42 shown in Figure 1. A screw 108 secures the connection terminals 106 and 107 to the bushing. One end of the suspension element 36 is secured to the terminal 106 and the terminal 107 is connected to the fixed terminal 45 by a preferably flexible lead 110. A fastening screw 111 operates within a threaded hole provided in the frame member 12', said screw serving to lock the bushing against rotation. Upon loosening the screw 111 the bushing may be rotated and since the end of the suspension element is secured to the terminal carried by the bushing, rotation of the bushing tends to twist the suspension element about its axis thereby causing a corresponding rotation of the movable coil. It will be apparent therefore, that the bushing 105 serves as a means for setting the zero position of the movable coil as desired. A single such adjustment arrangement is sufficient to provide a practical range of coil adjustment but it is, of course, possible also to provide a similar rotatable bushing arrangement for the lower suspension element.

Having now described my invention in detail in accordance with the requirements of the patent statutes what I desire to protect by Letters Patent of the United States is set forth in the following claims.

I claim:

1. An instrument relay comprising an open iron frame, front and back members closing said frame, a wire-wound movable coil enclosed in said frame and carrying a movable contact arm, a permanent magnet core for said coil, means supporting said core from and spacing it with respect to said back member, a stationary contact carried by said frame and adapted to be engaged by the said contact arm, permanent magnets in line with one another and said core and respectively supported on opposite sides of said frame, so that said frame forms the return magnetic circuit for all of said permanent magnets, a magnetic flux gap between each of said magnets and said core, and aligned taut elements suspending the movable coil from said frame for rotation within the flux gaps, said suspending elements also serving to conduct current from an external circuit to the movable coil.

2. An instrument relay comprising a permanent magnet core, a substantially rectangular open soft-iron frame surrounding the core in the plane of the polar surfaces, a stationary contact supported by the frame, a wire-wound movable coil, aligned taut suspension elements each having an end affixed to opposite end arms of the frame and an end secured to the movable coil, a contact arm carried by the movable coil and adapted to engage the stationary contact upon a predetermined angular rotation of the movable coil about the axis formed by the suspension elements.

3. The invention as recited in claim 2 including set of auxiliary permanent magnets secured to opposite side arms of the frame, said auxiliary magets being arranged in magnetic series with the magnet core but spaced from the polar surfaces thereof to form a magnetic flux gap within which the movable coil rotates.

4. The invention as recited in claim 3 wherein said frame being made of soft-iron serves as a return path for the magnetic flux generated by the magnets.

5. The invention as recited in claim 2 wherein the said contact arm is electrically insulated from the suspension elements and including a hair spring having one end secured to a fixed connection terminal carried by the frame and the other end in electrical contact with the said contract arm.

6. The invention as recited in claim 5 wherein the stationary contact is a permanent magnet and the said contact arm carries a soft-iron rider for engagement therewith and including means operable to separate the said rider from the stationary contact magnet.

7. The invention as recited in claim 6 including electromagnetic means for moving the stationary contact away from said rider and fixed stop means limiting the movement of the rider while engaged with the stationary contact.

8. The invention as recited in claim 2 wherein the end of one of the suspension elements is affixed to an end arm of the frame by means including a rotatable bushing, and including means settable to prevent rotation of said bushing.

9. An instrument relay comprising a permanent magnet core; a substantially rectangular open iron frame surrounding the core in the plane of the polar surfaces; a wire-wound movable coil encircling the core; a pair of insulator bushings carried by opposite end arms of the frame, each bushing having an axial hole extending therethrough, a pair of aligned, taut suspension elements each having an end secured to the movable coil and the other end passing through the hole in one of said bushings; fixed terminals to which the said other ends of the suspension elements are secured; a contact arm carried by the movable coil; a stationary contact carried by the frame and adapted for engagement with the contact arm upon a predetermined angular rotation of the movable coil about the axis formed by the suspension elements; and means operable to disengage the contact arm from the stationary contact.

10. The invention as recited in claim 9 wherein one of said insulator bushings is rotatable relative to the frame and one of said fixed terminals is carried by such rotatable bushing and including means to secure such bushing against rotation.

11. The invention as recited in claim 10 wherein the said suspension elements are individually connected to the ends of the wire-wound movable coil, and including means electrically insulating the said contact arm from the suspension elements, a hair spring having one end connected to the contact arm and the other end secured to a fixed connection terminal carried by the frame.

12. An instrument relay comprising a permanent magnet core; a substantially rectangular open iron frame surrounding the core in the plane of the polar surfaces; aligned, taut suspension elements each having one end secured to the frame and the other end secured to the movable coil; a contact arm carried by the movable coil; a pair of soft-iron riders secured to diametrically opposed points on the contact arm, and a pair of stationary, magnetic contacts carried by opposite side arms of the frame, said stationary contacts being individually engaged by the said riders upon a predetermined angular rotation of the movable coil about the axis formed by the suspension elements to close a circuit between said magnetic contacts and thereby avoid the need to use a spiral hair spring in such circuit.

13. An instrument relay comprising a substantially rectangular, open frame at least a portion of which is made of soft-iron; a substantially cylindrical, transversely charged, permanent magnet core; a closure plate closing one open face of the frame; means mounting the core on the said closure plate, a pair of auxiliary permanent magnets secured to opposite side arms of the frame, said auxiliary magnets being arranged in magnetic series with the magnet core and spaced therefrom to form magnetic flux gaps; a wire-wound movable coil; a pair of aligned, taut suspension elements each having one end secured to the movable coil and the other end secured to opposite end arms of said frame, said elements supporting the movable coil for rotation within the said flux gaps and about the axis formed by the elements; means electrically insulating the suspension elements from the frame; means electrically connecting the said one end of each suspension element to the movable coil; a contact arm secured to the movable coil; a soft-iron rider carried by the contact arm; a stationary, magnetic contact disposed in the path of travel of said rider; means operable to disengage the said rider from the stationary contact; and a transparent member closing the other open face of the frame to thereby complete a case for the relay.

14. The invention as recited in claim 13 wherein the means operable to disengage the rider from the stationary contact comprises a mounting plate carried by the said transparent member and extending into the casing; means pivotally supporting the stationary contact on said mounting plate; a solenoid coil carried by said mounting plate; means effective upon energization of the solenoid coil to rotate the stationary contact about its pivot support; and a stop pin extending from the said mounting plate and into the path of travel of the said contact arm, said stop pin being effective to disengage the rider from the stationary contact upon rotation thereof.

15. The invention as recited in claim 13 wherein the said one end of each suspension element is secured to the movable coil by spring means that is resiliently deformable along the axis of the elements.

16. An improved arrangement for securing a suspension element to a wire-wound movable coil, said arrangement comprising a leaf spring having a tapered end portion and a bifurcated end portion, said end portions being bent upwardly so that the tapered end is disposed between the bifurcated end, while leaving a flat central portion, a pin secured to said tapered and bifurcated ends, an end of the suspension element passing between the said bifurcated ends, around the pin and passing through an aperture formed in the spring, means securing the end of the suspension element to the spring and means securing the flat portion of the spring to the movable coil.

17. An instrument relay comprising a permanent magnet core, an open substantially rectangular soft iron frame surrounding the core in the plane of its polar surfaces, a wire-wound movable coil, a pair of pivot bases secured to top and bottom of said coil, each base having a threaded axial hole, a screw received in said hole, aligned taut suspension elements, each having an end affixed to opposite end arms of the frame and the other end secured to the movable coil, a leaf spring secured to each base by said screw, and taut suspension elements each with one end secured to a leaf spring in line with said screws, and with its outer end secured to the frame, one of said securing means including a bushing through which said member passes and which is rotatable to allow for setting said coil to zero position, and means to prevent undesired rotation of said bushing.

References Cited in the file of this patent

UNITED STATES PATENTS

| | | |
|---|---|---|
| 922,780 | Kitsee | May 25, 1909 |
| 1,927,346 | Lawrence | Sept. 19, 1933 |
| 2,464,886 | O'Reilly | Mar. 22, 1949 |
| 2,508,380 | Freedman | May 23, 1950 |
| 2,518,609 | Fogle | Aug. 15, 1950 |
| 2,565,312 | Lamb | Aug. 21, 1951 |
| 2,573,000 | Fischer | Oct. 30, 1951 |
| 2,573,183 | Chudyk | Oct. 30, 1951 |
| 2,603,730 | Pethes | July 15, 1952 |
| 2,677,735 | Beach | May 4, 1954 |
| 2,716,680 | Muzzey | Aug. 30, 1955 |
| 2,760,125 | Pethes | Aug. 21, 1956 |

FOREIGN PATENTS

| | | |
|---|---|---|
| 720,744 | Great Britain | Dec. 29, 1954 |